Nov. 24, 1959                R. E. MEYER ET AL                2,913,875
                          IGNITER FUEL INJECTOR DEVICE
Filed Aug. 22, 1957                                        3 Sheets-Sheet 1
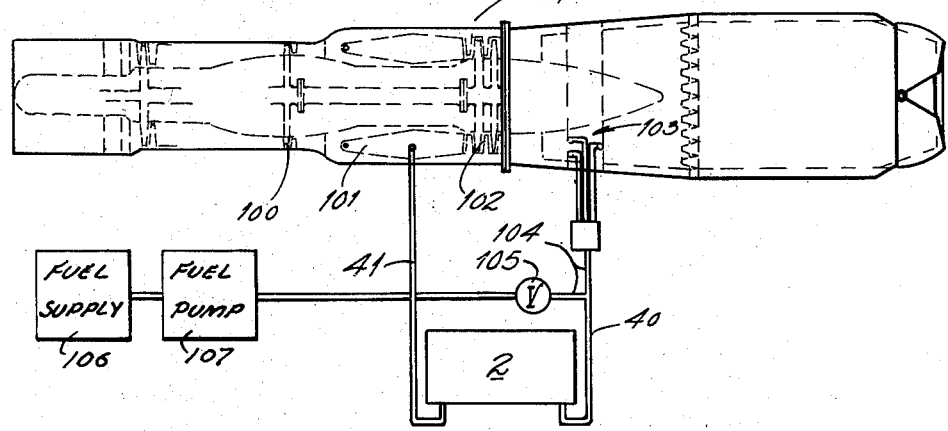
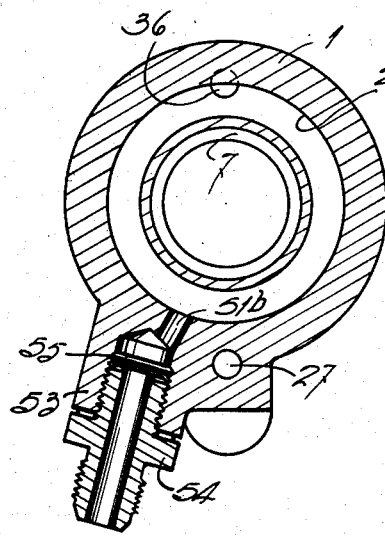
INVENTOR.
ROBERT E. MEYER
CARLTON W. BRISTOL, JR.
BY HARRY C. GRAY
ATTORNEYS Nov. 24, 1959  R. E. MEYER ET AL  2,913,875
IGNITER FUEL INJECTOR DEVICE
Filed Aug. 22, 1957  3 Sheets-Sheet 2

Fig. 2

INVENTOR.
ROBERT E. MEYER
CARLTON W. BRISTOL, JR.
BY HARRY C. GRAY

ATTORNEYS

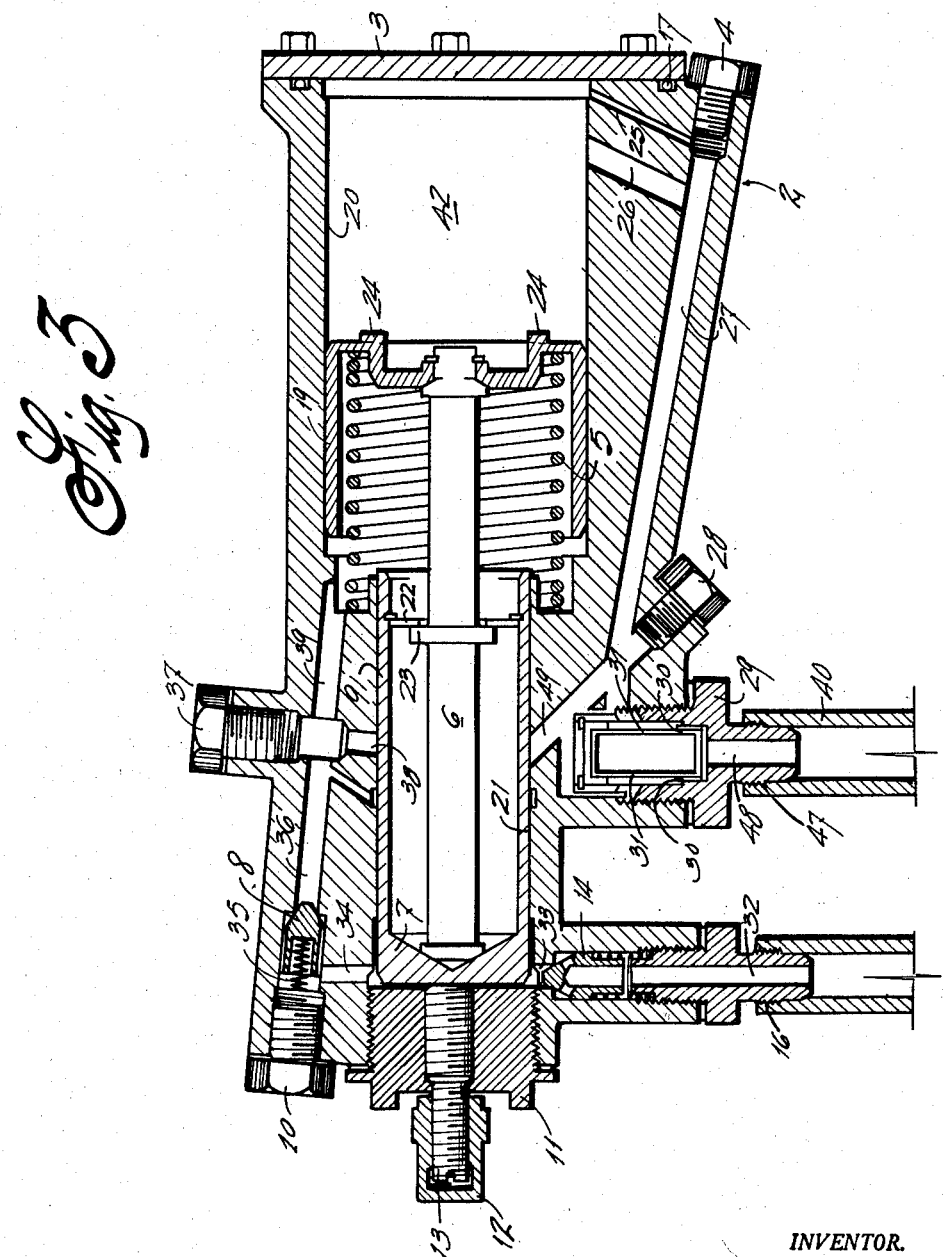

2,913,875

IGNITER FUEL INJECTOR DEVICE

Robert E. Meyer and Carlton W. Bristol, Jr., Glastonbury, and Harry C. Gray, Portland, Conn., assignors, by mesne assignments, to the United States of America as represented by the Secretary of the Navy Application August 22, 1957, Serial No. 679,790

1 Claim. (Cl. 60—39.82)

This invention relates to afterburner ignition control systems of the "single shot type," wherein an additional high pressure squirt of fuel is injected into the afterburner combustion chamber to ignite the afterburner fuel-combustion gas mixture.

It is an object of this invention to provide an igniter ignition device which eliminates the use of a high temperature air supply and the use of servo valves, both of which are conventional in prior ignition systems.

It is a further object of this invention to provide an afterburner ignition device which is of simple construction but retains all of the merits of prior igniter devices.

These and other objects will be readily apparent to those skilled in the art from an examination of the following description and attached drawings wherein, Figure 1 is a view of the aircraft with relation to the igniter control, Figure 2 is a cross-sectional view of the igniter in non-afterburning position, Figure 3 is a similar cross-sectional view of the igniter in afterburning position, and Figure 4 is a view along lines 4—4 of Figure 2.

Referring to Figure 1, an aircraft 99 has the usual compressor 100, combustion chamber 101, turbine 102 located therein. An afterburner manifold 103 is located in the exhaust section and is connected to the supply 106 via valve 105 and connecting conduit 104. It is, of course, assumed that additional afterburner control apparatus may be used to tie in the igniter and afterburner feed with the main fuel feed or exhaust nozzle control, or both, together with various controls making the afterburner responsive to various conditions of flight.

The igniter control is mounted on the aircraft with a line 40 feeding fuel to the control from the A/B fuel line and a line 41 squirting fuel from the igniter into the combustion chamber 101, which squirted fuel is to be heated by the combustion products in its passage through the turbine.

Referring to the detailed construction of Figures 2 and 3, the igniter consists of a body 2 having a cylindrical section 20 extending through half its length and a smaller cylindrical section 21 extending through the remaining half. A cover 3 abuts against one end of the body closing off the opening to the larger of the two cylinders; sealing of the cylinder 20 is accomplished at this end by means of a standard O-ring 17 between cover and body.

At the opposite end of the body 2, a cover 11 closes off the smaller of the two cylindrical sections; the cap is centrally drilled and tapped to provide thread means for an adjustment screw 13, whose function is described later herein. A lock nut 12 surrounds the projecting end of adjusting screw 13 to prevent accidental manipulation of such screw and to retain screw 13 in place.

The larger bore 20 has an open-ended piston 19 therein with the working face opposite cover 3; face extensions 24 are formed on the piston to create a cavity 42 between the piston and cover when the piston is in its fully retracted position.

A second piston 7 is located in the smaller of the two bores with its working face being opposite cover 11. A rod 6 is secured to piston 19 and abuts piston 7; clips 22 mate with flange 23 on the rod to maintain the rod in positive engagement with both pistons. A spring 5 abuts an internal shoulder and biases piston 19 to its retracted position shown in Figure 2.

The inlet to the igniter comprises a boss 45 having a central bore 46; the bore is closed off by a cap 29 having a threaded extension 47 for securing connecting line 40 thereto; at its other extremity line 40 is coupled to afterburner manifold line 104. A filter tube 30 is press fitted into cap 29 with filtered ports 31 in the tube providing communication between bore 46, the interior of the tube, passage 48 in boss 29 and conduit 40.

Bore 46 is connected to passage 27 running approximately parallel to the longitudinal axes of bores 20, 21. One end of the passage 27 terminates in bore 46 while the opposite end is open adjacent the cover 3; this opposite end is closed off by a plug 4.

Passages 25, 26 are drilled at an acute angle to passage 27 and interconnect cylinder 20 with passage 27. Passage 25 is of a small bore and terminates adjacent cover 3 into chamber 42 when the piston 19 is in its retracted position. Passage 26 is of a larger cross-sectional bore than passage 25 and when piston 19 is in its retracted position, the passage terminus is covered by the side wall face of the piston.

Adjacent the inlet boss 45, a passage 49 is drilled cutting across or interconnecting passage 27, bore 46 and cylinder 21; the open end of the passage adjacent the body wall is fitted with a conventional plug 28.

Also extending from the lower section of body 2 and adjacent boss 46 is the fuel outlet structure comprising a second boss 32 having a bore 51 therein terminating in a port 33 which links the bore with the cylinder section 21. A cap 51a closes off the bore and is provided with fitting means 16 for attachment of conduit 41, which conduit is connected at its other extremity to the combustion chamber 101. A valve 14 controlled by a spring 50 bears against port 33 and controls the fluid flow from cylinder 21 into conduit 41 and the combustion chamber.

In the upper section of body 2, another passage 36 is drilled longitudinally of the body and terminates in cylinder 20. Cross-passages 38, 34 are drilled laterally of body 2 into cylinder 21 and interconnect passage 36 with the cylinder. A spring biased valve 8 controls the flow between passage 36 and passage 34; spring 35 biases the valve to a constant closed position. Caps 10 and 37 plug the open ends of passages 38 and 36.

Referring to Figure 4, a weep drain is provided affording communication between cylinder 20 and a sump (not shown). The drain comprises a boss 53 extending from body 2 and having a central bore 55 therein; a fitting 54 is fitted into the bore for attaching any type of hose or conduit leading from the sump. Port 51b allows free communication between the bore 55 and the interior of cylinder 20.

Operation

In the non-afterburning position piston 19 is retracted against cover 3 by the action of spring 5 (Figure 2). No fuel flows through conduit 40 as valve 105 (Figure 1) is in the "off" position.

When this valve is operated to "open" position, fuel is forced in from supply 106 by a conventional pump 107 into A/B injector 103. Simultaneous with such operation, fuel feeds into conduit 40, through filter 30 (Figure 2), into bore 46, and passages 49 and 27. From passage 49, the fuel flows to fill cylinder chamber 21; any excess of fuel flows out port 38 into passages 36 and cylinder chamber 20 where it empties out through weep drain 53, 54. Fuel passing through passage 27 enters chamber 42 to the right of piston 19 via the small bore passage 25. Thus, there is a time delay created allowing cylinder chamber 21 to be filled to capacity as piston 19 slowly moves to the left. The area of port 51b, which connects the weep drain 53 with chamber 20 and 21 and eventually with inlet 40, is constructed much smaller than the areas of passageways 26 and 25. This permits the pressure to build up in chamber 42 after chamber 21 has been filled.

Upon continued travel of piston 19, piston 7 cuts off flow from passage 49 and any flow into passage 38 (Figure 3), while piston 19 uncovers the larger bore passage 26 thereby increasing the flow into chamber 42 and accelerating the travel of the pistons. The A/B igniter injection phase now commences. The pressure in cylinder chamber 21 builds up until valve 14 opens and a high pressure squirt of fuel is injected into line 41 and combustion chamber 101; check valve 8 prevents by-pass of fuel into passage 36. Ignition in the afterburner follows the usual process; the igniter fuel is heated to incandescence during its passage through the combustion chamber and turbine; upon mixing with the A/B fuel in the exhaust, it ignites the fuel-combustion products mixture. The injection phase continues until piston 19 reaches its limit of travel (Figure 3). Check valve 14 is then biased to closed position by the pressure of the gases in the combustion chamber preventing these gases from entering the main portion of body 2. Since the igniter is of the single shot type, its various parts remain in the relative positions shown in Figure 3.

Upon completion of the afterburning phase, fuel to the A/B is cut off by valve 105; spring 5 urges piston 19 to its retracted position and the fuel in chamber 42 is forced back to the A/B manifold through line 27 and line 40. Simultaneous with this retraction, check valve 8 opens to vent the cylinder 21 to cylinder 20 and the weep drain.

In the event that the amount of fuel injected into the A/B is desired to be varied, lock nut 12 is removed and screw 13 is adjusted to project further into cylinder 21; this, of course, affects the bottoming of piston 7.

Obviously many modifications and variations of the present invention are possible in the light of the above teachings. It is therefore to be understood that within the scope of the appended claim the invention may be practiced otherwise than as specifically described.

What is claimed is:

The combination with the afterburner combustion chamber of a turbo jet engine, of an igniter fuel injector in communication therewith and comprising a body having a first cylindrical chamber and a second cylindrical chamber therein, the bore of said first chamber being greater than the bore of the second chamber and being axially disposed thereto; pistons in each of said chambers; means to interconnect said pistons for concerted operation; a fuel supply source; conduit means to couple the supply source with each of the said chambers; additional conduit means coupling said supply source with the first chamber only after its piston has travelled a predetermined distance whereby a time delay is effected so that fuel from the supply source can flow into the second chamber before the supply thereto is closed off by movement of the piston therein; outlet means coupling said second chamber with the afterburner combustion chamber; means responsive to a pressure build-up in the second chamber for injecting a high pressure of fuel into the outlet means; adjustable means in the second chamber for regulating the amount of fuel injected into the outlet means; and means for venting the cylinders after the fuel has been injected into the outlet means.

References Cited in the file of this patent

UNITED STATES PATENTS

| 351,657 | Schofield | Oct. 26, 1886 |
| 1,260,091 | Stubblefield | Mar. 19, 1918 |
| 2,780,055 | Bristol | Feb. 5, 1957 |

FOREIGN PATENTS

| 659,802 | Great Britain | Oct. 31, 1951 |